United States Patent
Hsieh et al.

(10) Patent No.: US 9,122,342 B2
(45) Date of Patent: Sep. 1, 2015

(54) ELECTRONIC DEVICE WITH TOUCH PANEL

(75) Inventors: Kuan-Hong Hsieh, Tu-Cheng (TW);
Han-Che Wang, Tu-Cheng (TW);
Li-Zhang Huang, Tu-Cheng (TW);
Wen-Hsiang Lu, Tu-Cheng (TW);
Ji-Bao Fu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 509 days.

(21) Appl. No.: 13/476,030

(22) Filed: May 21, 2012

(65) Prior Publication Data

US 2013/0070157 A1    Mar. 21, 2013

(30) Foreign Application Priority Data

Sep. 15, 2011   (CN) .......................... 201110273421.8

(51) Int. Cl.
| | |
|---|---|
| G06F 3/041 | (2006.01) |
| H05B 37/02 | (2006.01) |
| H04N 21/414 | (2011.01) |
| H04N 21/422 | (2011.01) |
| H04N 21/485 | (2011.01) |
| G06F 3/0488 | (2013.01) |
| G06F 3/0484 | (2013.01) |
| H04N 21/443 | (2011.01) |

(52) U.S. Cl.
CPC .......... *G06F 3/0416* (2013.01); *G06F 3/04847* (2013.01); *G06F 3/04883* (2013.01); *H04N 21/41407* (2013.01); *H04N 21/42224* (2013.01); *H04N 21/485* (2013.01); *H04N 21/4852* (2013.01); *H04N 21/4854* (2013.01); *H05B 37/02* (2013.01); *H05B 37/0272* (2013.01); *H04N 21/4436* (2013.01)

(58) Field of Classification Search
CPC ................ G06F 3/03547; G06F 3/041; G06F 3/044–3/047; G06F 3/0488; G06F 3/04886; H04M 2250/22
USPC ..................... 345/173, 174; 178/18.01–18.08
See application file for complete search history.

(56) References Cited

U.S. PATENT DOCUMENTS

| | | | | |
|---|---|---|---|---|
| 5,666,765 | A | * | 9/1997 | Sarner et al. .................... 52/36.1 |
| 2006/0028454 | A1 | * | 2/2006 | Branton et al. ............... 345/173 |
| 2009/0139778 | A1 | * | 6/2009 | Butler et al. ............... 178/18.03 |
| 2011/0007022 | A1 | | 1/2011 | Laurent et al. |

FOREIGN PATENT DOCUMENTS

| | | |
|---|---|---|
| CN | 101395562 A | 3/2009 |
| TW | 201039113 A1 | 11/2010 |

* cited by examiner

*Primary Examiner* — Jimmy H Nguyen
(74) *Attorney, Agent, or Firm* — Novak Druce Connolly Bove + Quigg LLP

(57) ABSTRACT

An electronic device includes a power management unit, a touch panel including a first touch area and a second touch area, a first indicator, a second indicator, and a processing unit. The first touch area and the second touch area are respectively located on two sides of the touch panel, and is used to produce touch signals in response to a user's touch. The position of the first indicator and a second indicator are respectively corresponding to the first touch area and the second touch area. The processing unit controls the power management unit to provide power to the first indicator only when determining the first touch area is touched by the user according to the touch signals received by it, and control the power management unit to provide power to the second indicator only when determining the second touch area is touched.

10 Claims, 3 Drawing Sheets

ELECTRONIC DEVICE WITH TOUCH PANEL

CROSS-REFERNCE TO RELATED APPLICATIONS

The subject matter disclosed in this application is related to subject matters disclosed in a copending application entitled, "TOUCH INPUT DEVICE AND ELECTRONIC DEVICE USING THE SAME", filed May 21, 2012, Ser. No. 13/476,032, and assigned to the same assignee as named herein.

BACKGROUND

1. Technical Field

The present disclosure relates to electronic devices, particularly, to an electronic device with a touch panel.

2. Description of Related Art

Nowadays, electronic devices, such as mobile phones, remote controllers, and media players, with a touch panel, are more and more popular due to the convenience of using touch panel as input device. However, conventional touch panels cannot indicate touch position of the touch panel, and thus lacking of fun to play with when being operated.

Therefore, it is desirable to provide an electronic device with touch panel to overcome the described limitations.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
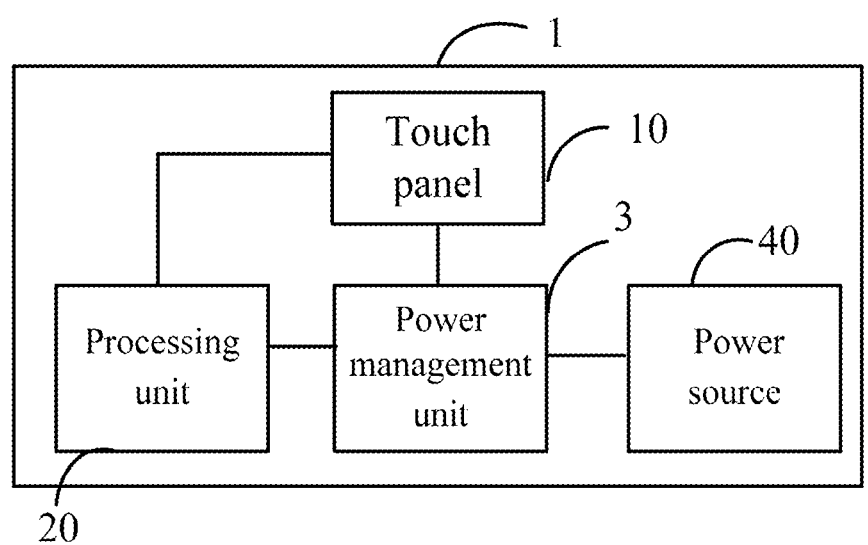
FIG. 1 is a circuit diagram of an electronic device with a touch panel, in accordance with an exemplary embodiment.
Figure 2:
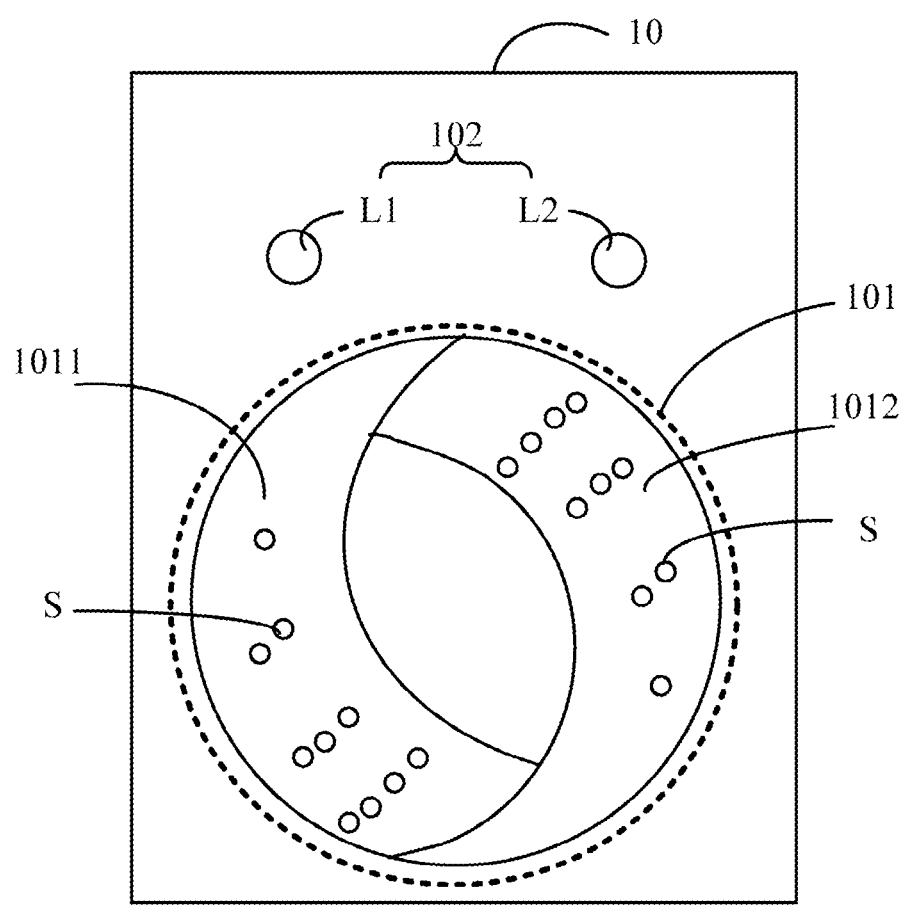
FIG. 2 is a schematic diagram of a touch panel of the electronic device of FIG. 1, in accordance with a first embodiment.

Referring to FIGS. 1 and 2 together, an electronic device 1 includes a touch panel 10, a processing unit 20, a power management unit 30, and a power source 40. As shown in FIG. 2, the touch panel 10 includes a touch area 101 and an indication unit 102. In detail, the touch area 101 includes a first touch area 1011 and a second touch area 1012. The indication unit 102 includes a first indicator L1 and a second indicator L2. The power source 40 can be a battery or an adapter. The power management unit 30 is used to manage the power of the power source 40.

In the embodiment, the first touch area 1011 and the second touch area 1012 are respectively located on two sides of the touch area 101, and the location of the first indicator L1 and a second indicator L2 are respectively corresponding to the first touch area 1011 and the second touch area 1012. The first touch area 1011 and the second touch area 1012 are used to produce touch signals in response to user's touch. The processing unit 20 is connected to the touch panel 10, and is used to receive the touch signals produced by the first touch area 1011 or the second touch area 1012, and determine whether the first touch area 1011 or the second touch area 1012 is touched according to the touch signals. If the processing unit 20 determines the first touch area 1011 is touched by the user, then the processing unit 20 also controls the power management unit 20 to provide power to the first indicator L1 and stop providing power to the second indicator. If the processing unit 20 determines the touch area 1012 is touched by the user, then the processing unit 20 controls the power management unit 20 to stop providing power to the first indicator L1 and provide power to the second indicator.

Therefore, the electronic device 1 can light the first indicator L1 or the second indicator L2 to indicate the touch area of the touch panel 10 that is touched.

As shown in FIG. 2, the first touch area 1011 and the second touch area 1012 both are meniscus-shaped, and the width of the first touch area 1011 and the second touch area 1012 are changed gradually. The first touch area 1011 and the second touch area 1012 are joined end to end forming a ring. The first touch area 1011 and the second touch area 1012 each includes a number of touch sensors S. The number of touch sensors S arranged in the first touch area 1011 and the second touch area 1012 are gradually decreased as the width of the touch area 1011/1012 is gradually decreased. Each touch sensors S is used to produce a touch signal in response to the user's touch, the processing unit 20 receives the touch signal, determines a touch path according to the changes of the quantity of the received touch signals, and produces a control signal corresponding to the touch path.

In the embodiment, the touch sensors S arranged in the widest portion of the first touch area 1011 and the second touch area 1012 can be full covered by the user's fingertip. In the embodiment, the processing unit 20 determines the touch path is a first touch path when determining the quantity of the received touch signals is decreased, and determines the touch path is a second touch path when determining the quantity of the received touch signals is increased. Namely, the first touch path is defined as a touch from the wide portion to the narrow portion of the first touch area 1011 and the second touch area 1012, and the second touch path is defined as a touch from the narrow portion to the wide portion of the first touch area 1011 and the second touch area 1012. In the embodiment, the first touch path corresponds to a control signal to decrease a particular parameter, and the second touch path corresponds to a control signal to increase the particular parameter. The processing unit 20 produces the control signal to decrease the particular parameter when determining the touch path is the first touch path, and produces the control signal to increase the particular parameter when determining the touch path is the second touch path.

In the embodiment, the electronic device 1 is a remote controller for controlling lighting. The particular parameter is brightness of the lighting. The processing unit 20 produces a control signal to decrease the brightness of the lighting when determining the touch path is the first touch path, and produces the control signal to increase the brightness of the lighting when determining the touch path is the second touch path. In another embodiment, the electronic device 1 is a remote controller for controlling a television, and the particular parameter is volume, brightness, or contrast ratio of the television. In further another embodiment, the electronic device 1 is a remote controller for controlling an air condition and the particular parameter is wind speed, or temperature of the air condition. In another embodiment, the electronic device 1 is a mobile phone, a media player and other portable electronic devices. The particular parameter is volume, brightness of the display, etc.

Obviously, the electronic device 1 may include some input keys to execute particular function.

In the embodiment, the width of the first touch area 1011 and the second touch area 1012 are changed from wide to narrow along the clockwise direction. As shown in FIG. 2, the width of the first touch area 1011 and the second touch area 1012 are gradually decreased along the clockwise direction. Therefore, if the user touches the touch area 101 along the clockwise direction, no matter the first touch area 1011 or the second touch area 1012 is touched, the touch path is the first touch path, and the processing unit 20 then produces the control signal to decrease the particular parameter. If the user touches the touch area 101 along the anticlockwise direction, no matter the first touch area 1011 or the second touch area 1012 is touched, the touch path is the second touch path, and the processing unit 20 then produces the control signal to increase the particular parameter. Obviously, the width of the first touch area 1011 and the second touch area 1012 can also be increased from wide to narrow along the clockwise direction.

Figure 3:
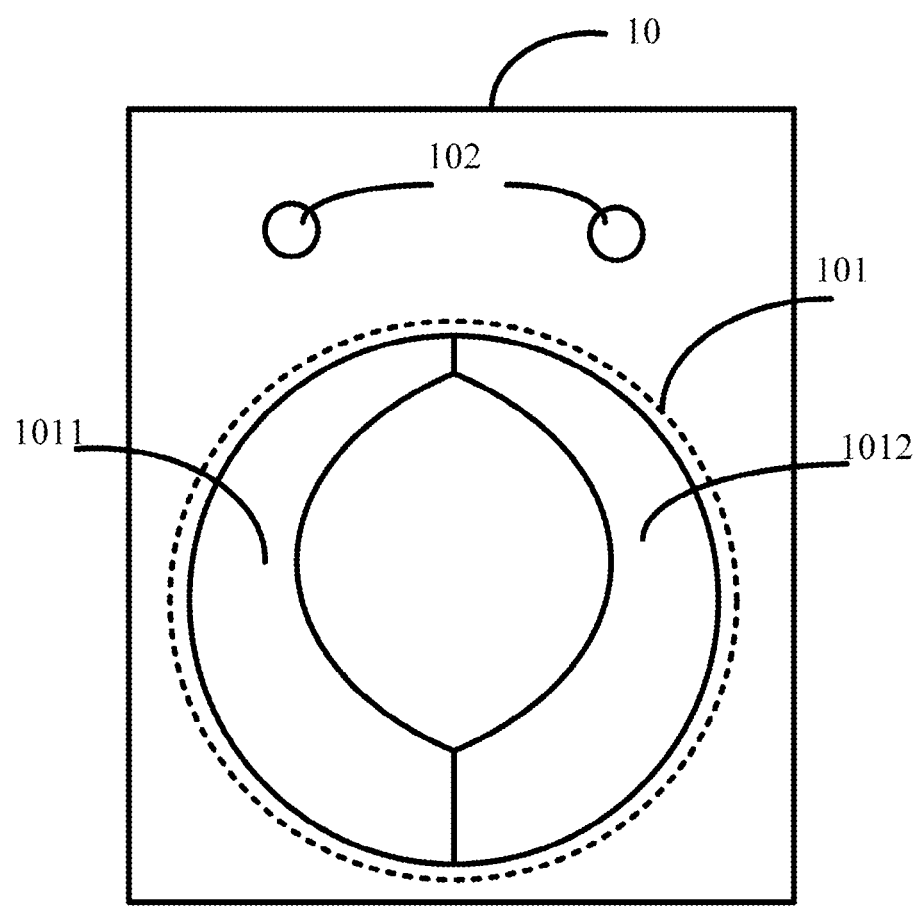
FIG. 3 is a schematic diagram of a touch panel of the electronic device of FIG. 1, in accordance with a second embodiment.

In other embodiment, the width of one of the first touch area 1011 and the second touch area 1012 is decreased along the clockwise direction, and the width of the other of the first touch area 1011 and the second 1012 is increased along the clockwise direction. As shown in FIG. 3, the width of the first touch area 1011 is decreased along the clockwise direction and the width of the second touch area 1012 is increased along the clockwise direction. Therefore, when the user touches the first touch area 1011 along the clockwise direction, the touch path is the first touch path, when the user touches the second touch area 1012 along the clockwise direction, the touch path is the second touch path, vice versa.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
a power management unit, configured to manage the power of a power source;
a touch panel comprising a first touch area and a second touch area, wherein, the first touch area and the second touch area are respectively physically located on two sides of the touch panel, and are configured to produce touch signals in response to a user's touch, the first touch area and the second touch area both are meniscus-shaped, and the respective widths of the first touch area and the second touch area are changed gradually, each of the first touch area and the second touch area are joined end to end forming a ring; each of the first touch area and the second touch area comprises several touch sensors, and the respective quantities of the touch sensors arranged in the first touch area or the second touch area are gradually decreased as the width of the first touch area or the second touch area is gradually decreased;
an indication unit comprising a first indicator and a second indicator, wherein, the respective positions of the first indicator and a second indicator correspond to the first touch area and the second touch area; and
a processing unit, configured to receive the touch signals produced by the first touch area or the second touch area, and determine whether the first touch area or the second touch area is touched according to the received touch signals, control the power management unit to provide power to the first indicator and stop providing power to the second indicator when determining the first touch area is touched by the user, control the power management unit to stop providing power to the first indicator and provide power to the second indicator when determining the second touch area is touched.

2. The electronic device according to claim 1, wherein each touch sensor is used to produce a touch signal in response to the user's touch, the processing unit receives the touch signal, determines a touch path according to the changes of the quantity of the received touch signals, and produces a control signal corresponding to the touch path.

3. The electronic device according to claim 2, wherein the processing unit determines the touch path is a first touch path when determining the quantity of the received touch signals is decreased, and determines the touch path is a second touch path when determining the quantity of the received touch signals is increased, the processing unit produces a control signal to decrease a particular parameter when determining the touch path is the first touch path, and produces a control signal to increase the particular parameter when determining the touch path is the second touch path.

4. The electronic device according to claim 3, wherein the electronic device is a remote controller for controlling a lighting, and the particular parameter is brightness of the lighting.

5. The electronic device according to claim 3, wherein the electronic device is a remote controller for controlling a television, and the particular parameter is volume, brightness, or contrast ratio of the television.

6. The electronic device according to claim 3, wherein the electronic device is a remote controller for controlling an air condition, and the particular parameter is wind speed, or temperature of the air condition.

7. The electronic device according to claim 3, wherein the electronic device is a portable electronic device comprising a mobile phone and a media player, the particular parameter is volume or brightness of a display of the portable electronic device.

8. The electronic device according to claim 1, wherein the width of the first touch area and the second touch area are both changed from wide to narrow along a clockwise direction or an anticlockwise direction.

9. The electronic device according to claim 1, wherein the width of the first touch area is increased along a clockwise direction, and the width of the second touch area are decreased along the clockwise direction.

10. The electronic device according to claim 1, wherein the width of the first touch area is decreased along a clockwise direction, and the width of the second touch area are increased along the clockwise direction.

* * * * *